United States Patent
Marquardt

(10) Patent No.: US 7,269,037 B2
(45) Date of Patent: Sep. 11, 2007

(54) POWER SUPPLY WITH A DIRECT CONVERTER

(75) Inventor: Rainer Marquardt, Ottobrunn/Riemerling (DE)

(73) Assignee: Siemens Aktiengesellschaft, Munich (DE)

(*) Notice: Subject to any disclaimer, the term of this patent is extended or adjusted under 35 U.S.C. 154(b) by 420 days.

(21) Appl. No.: 10/505,547

(22) PCT Filed: Apr. 16, 2003

(86) PCT No.: PCT/DE03/01286

§ 371 (c)(1),
(2), (4) Date: Aug. 23, 2004

(87) PCT Pub. No.: WO03/090331

PCT Pub. Date: Oct. 30, 2003

(65) Prior Publication Data

US 2005/0083716 A1    Apr. 21, 2005

(30) Foreign Application Priority Data

Apr. 22, 2002 (DE) .............................. 102 17 889

(51) Int. Cl.
*H02M 7/48* (2006.01)
(52) U.S. Cl. .................. 363/71; 363/64; 363/132
(58) Field of Classification Search ............ 363/34–41, 363/97, 98, 71–79, 131, 132, 64–65; 318/254, 318/439
See application file for complete search history.

(56) References Cited

U.S. PATENT DOCUMENTS 6,519,169 B1 *  2/2003  Asplund et al. ............ 363/132
6,879,503 B2 *  4/2005  Meynard et al. ............ 363/71

FOREIGN PATENT DOCUMENTS

| | | |
|---|---|---|
| DE | 26 14 445 C2 | 4/1976 |
| DE | 197 21 450 C1 | 5/1997 |
| DE | 196 35 606 A1 | 3/1998 |
| DE | 198 32 225 A1 | 1/2000 |
| FR | 2 814 006 A1 | 3/2002 |
| GB | 2 294 821 A | 5/1996 |

OTHER PUBLICATIONS

Bum-Seok Suh, et al., "A New Multilevel Inverter Topology With A Hybrid Approach", EPE '99 Lausanne, pp. 1-9, no date.
Jih-Sheng Lai, et al., "Multilevel Converters—A New Breed of Power Converters", IEEE Transactions on Industry Applications, vol. 32, No. 3, May/Jun. 1996, pp. 509-517.

(Continued)

*Primary Examiner*—Rajnikant B. Patel
(74) *Attorney, Agent, or Firm*—Harness, Dickey & Pierce, PLC

(57) ABSTRACT

A power supply includes a direct converter provided in the form of a two-phase or three-phase bridge circuit. The bridge branche of the direct converter includes a serial connection of any number of identical two-terminal networks, each having the following characteristics: The two-terminal networks each have at least one switching state, in which their terminal voltage takes on positive values independent of the magnitude and polarity of the terminal current; the two-terminal networks each have at least one switching state, in which their terminal voltage takes on negative values independent of the magnitude and polarity of the terminal current; the two-terminal networks have at least one internal energy store.

6 Claims, 7 Drawing Sheets

OTHER PUBLICATIONS

Philip C. Kjaer, et al., "A Primary-Switched Line-Side Converter Using Zero-Voltage Switching", IEEE Transactions on Industry Application, vol. 37, No. 6, Nov./Dec. 2001, pp. 1824-1831.

S. Ostlund, "Influence of The Control Principle on A High-Voltage Inverter System for Reduction of Traction-Tranformer Weight", EPE Aachen, 1989, pp. 561-566, no date.

N. Schibli, et al., "Single-And Three-Phase Multilevel Converters For Traction Systems 50Hz/16⅔ Hz", Industrial Electronics Laboratory LEI, Swiss Ferderal Institute of Technology, Swiss, pp. 4.210-4.215, no date.

M. Steiner, et al., "A New Transformerless Tropology for AC-FED Traction Vehicles Using Multi-Star Induction Motors", EPE '99 Lausanne, pp. 1-10, no date.

Marco V.M. Villaca, et al., "A Soft Switched Direct Frequency Changer", IEEE, 1995, pp. 2321-2326, no date.

Tony Lee, et al., "Performance of MCTS in a Current Regulated AC/AC PDM Converter", IEEE, 1999, pp. 935-941, no date.

Robert W. Erickson, et al., "A New Family of Matrix Converters", IECON'01, The 27th Annual Conference of the IEEE, 2001, pp. 1515-1520, no date.

* cited by examiner

POWER SUPPLY WITH A DIRECT CONVERTER

This application is the national phase under 35 U.S.C. § 371 of PCT International Application No. PCT/DE03/01286 which has an International filing date of Apr. 16, 2003, which designated the United States of America and which claims priority on German Patent Application number DE 102 17 889.5 filed Apr. 22, 2002, the entire contents of which are hereby incorporated herein by reference.

FIELD OF THE INVENTION

The invention generally relates to a power supply with a direct converter which is in the form of a two-phase or three-phase bridge circuit. A system such as this may be used in particular for supplying power to rail vehicles, but may also be used just as well for supplying power to stationary devices, for example in conjunction with a medium-frequency transformer.

BACKGROUND OF THE INVENTION

Recently, for rail vehicles using an AC overhead wire, increasing attempts have been made to find technical solutions to avoid the need for the conventional network transformer. In particular, network transformers have the disadvantages that they are heavy and they incur relatively high energy losses.

One solution is to use superconducting transformers although, inter alia, they are more problematic for vehicle use owing to the cooling systems that are required, than for stationary systems, and are therefore not yet technically proven at the moment.

Other known solutions require the direct connection of the power-electronic converters to the high voltage of the AC overhead wire. Until now, the disadvantages here have been the high technical complexity and a range of restrictions which prevent universal use, as will be explained in the following text.

In general, modern electric locomotives use power-electronic converters for feeding the traction motors and the auxiliary systems (air-conditioning system and other modes). The overhead wire voltages which have been introduced throughout the world for AC locomotives have, however, been chosen to be very high. This is done in order to minimize the transmission losses (in Europe: 15 KV/16 ⅔ Hz, as well as 25 KV/50 Hz). While avoiding the need for a network transformer by being connected directly to the overhead wire voltage, these high voltages require semiconductors or converter elements to be connected in series in the power electronics—as well as a high degree of technical complexity overall.

The following variants with direct connection of the power-electronic converters to the overhead wire voltage are known:
a) Use of high-voltage insulated traction motors without DC isolation between the motors of the overhead wire, for example, is known from Steiner et al, A New Transformerless Topology for AC-Fed Traction Vehicles using Multi-Star Induction Motors, EPE 1999, Lausanne. Solutions such as these have the advantage of a small number of power-electronic converter stages in the energy flow-path between the overhead wire and traction motors. This reduces the energy losses and the complexity of the power electronics. One example is shown in FIG. 6. On the other hand, the disadvantages include:

The increased motor isolation that is required has a disadvantageous effect on the physical motor size, on the motor weight and/or on the motor efficiency.

The power matching that is absolutely essential between the series-connected converter elements (when the motors are subject to different loads) requires the use of complex motor windings with a large number of connections carrying high voltages (so-called 3-star motors).

The number of traction motors cannot be varied freely. In order to limit the disadvantageous effects of the items mentioned above, as large a number of high-power motors as possible should be chosen.

The high DC voltage components between the series-connected converter elements make it harder to provide reliable isolation in actual conditions (dirt, moisture).

The feed for the auxiliary systems requires considerable additional complexity.

In order to maintain a restricted operating capability in the event of failures in the power section or in the event of insulation faults in the motors, additional switching devices are required (redundancy).

b) Use of conventional traction motors (with a low load on the insulation) without DC isolation from the overhead wire close to ground potential, for example as known from DE 197 21 450 C1. The disadvantages and restrictions of the first-mentioned solution are avoided with this embodiment of the motors. Further advantages are good efficiency and low harmonic current levels in the railroad network. However, the voltage transformation ratio required from the high input voltage (up to 25 kV rated value) to the normal output voltages for feeding the traction motors is about 10:1. In principle, power-electronic converters which provide a high voltage transformation ratio without the assistance of transformers are worse, in terms of the complexity for energy stores and semiconductor switches, than converters of the same rating that have to provide only a low voltage transformation ratio. This fundamental disadvantage, in particular the size of the energy stores that are required, prevents universal use of corresponding variants.

c) DC isolation of the motors from the overhead wire using a number of individual medium-frequency transformers, which each have associated individual, series-connected converter elements, for example as known from Schibli/Rufer, Single and Three-Phase Multilevel Converters for Traction Systems 50 Hz/16 ⅔ Hz, LEI, Lausanne, pages 4.210-4.215. Variants of this solution have already been very widely investigated. FIG. 7 shows a corresponding circuit arrangement. The following items are characteristic:

On the network side, groups of converter elements are connected in series and, overall, produce a staircase voltage whose controllable maximum values must be greater than the network voltage peak values.

Each of these converter element groups has a four-quadrant controller on the network side, a first DC voltage capacitor, a medium-frequency inverter on the primary side, a medium-frequency transformer, a medium-frequency rectifier on the secondary side, and a second DC voltage capacitor. All of the converters must be designed for both energy flow directions (energy drawn from the railroad network as well as energy feedback), if it is intended to be possible to feed energy back into the railroad network.

A solution such as this is not subject to the disadvantages of the first solution that was described (high-voltage insulated traction motors). The insulation load on the traction motors can be kept low. There are no restrictions to the number or operating voltages of the traction motors. Power matching between motors that are subject to different loads can be carried out via the DC busbar ($P_0$, $N_0$ in FIG. 7). On the other hand, the disadvantages are as follows:

The large number of power-electronic converter stages which are located in the energy flowpath between the overhead wire and the traction motors (high degree of complexity, relatively high energy losses).

The high degree of complexity for energy stores (2 DC voltage capacitors plus any series resonant circuits) for smoothing the power pulsation at twice the network frequency.

The large number of individual medium-frequency transformers required, which in total are worse than one central transformer in terms of the weight and the space required. Splitting into a large number of individual transformers is also disadvantageous, and occupies a large amount of space, as a result of the (in total) numerous transformer connection points on the high-voltage side.

As in the first-mentioned variant, the high DC voltage components between the series-connected converter elements make it harder to provide reliable isolation in actual conditions (dirt, moisture).

The feed for auxiliary systems requires considerable additional complexity.

In order to maintain a restricted operating capability in the event of failures in the power section or insulation faults in the motors, additional switching devices are required (redundancy).

d) DC isolation of the motors from the overhead wire using a medium-frequency transformer which is fed from the overhead wire by means of a direct converter, for example as known from DE 26 14 445 C2 or Östlund, Influence of the control Principle on a High-Voltage Inverter System for Reduction of Traction-Transformer Weight, EPE, Aachen 1989.

Solutions such as these likewise have the advantage of a reduced number of power-electronic converter stages located in the energy flowpath between the overhead wire and the traction motors. If the medium-frequency is sufficiently high (in the order of magnitude of about 1 KHz or more), the physical size, weight and energy losses in the medium-frequency transformer may be kept considerably lower than the corresponding disadvantages in the motors. In addition, it is possible to feed the auxiliary systems from the medium-frequency transformer efficiently and with little complexity. In general, this is advantageously done by means of a separate secondary winding on the medium-frequency transformer.

However, for several reasons, the provision of a direct converter with thyristors does not satisfy present or future requirements. The major disadvantages are:

The achievable medium frequency is restricted to a few 100 Hertz owing to the commutation times in a circuit fitted with thyristors. This frequency is not sufficient to significantly reduce the weight of the medium-frequency transformer.

The stringent interference current limit values (minimizing harmonic currents in the railroad network) for modern locomotives cannot be complied with because, in principle, the spectrum includes twice the medium frequency and other interference frequencies. Twice the medium frequency is, furthermore, far too low to be adequately damped by the inductive network impedance.

The primary winding in the medium-frequency transformer is loaded with the high peak voltage values of the overhead line voltage plus their transient overvoltage spikes. This makes it harder to provide isolation (winding isolation, air gaps, creepage paths) for the transformer.

Direct converters with power semiconductors which can be turned off (in general: IGBT transistors instead of thyristors) are known in the form of so-called matrix converters, for example from Kjaer et al, A Primary-Switched Line-Side Converter Using Zero-voltage Switching, IEEE Transactions on Industry Applications, Vol. 37, No. 6, pages 1824-1831. FIG. 8 shows the basic circuit of a matrix converter with the converter branches and the filter capacitor. The converter branches are provided in a known manner by way of bi-directional controllable electronic switches. Known implementations are:

Two thyristors (GTO thyristors) which can be switched off and are connected back-to-back in parallel. These components must have a reverse blocking capability, that is to say they must be able to block both voltage polarities (FIG. 9).

Two IGBT transistors which are connected back-to-back in parallel. These components must have a reverse blocking capability (FIG. 10).

Two IGBT transistors which are connected to back-to-back parallel-connected diodes. There is no need for components with a reverse blocking capability (FIG. 11).

However, the following disadvantages of direct converters are also associated with these embodiments. These are:

The low-frequency power pulsation (at twice the network frequency: $2f_N$) which occurs in single-phase AC networks and must be transmitted by the medium-frequency transformer. This has a disadvantageous influence on the physical size and efficiency of the medium-frequency transformer.

The filter capacitor which is required on the network side and can cause interference resonances in the railroad network, and which can lead to the circuit having undesirably low input impedances for higher-frequency interference currents.

In contrast to converters with a DC voltage intermediate circuit ("U converters"), the power semiconductors have no protection against high-energy network overvoltages, as provided by a capacitor on the DC voltage side. This necessitates comparatively considerable derating of the semiconductor reverse voltages.

The harmonic content of the converter voltages which are produced is very high both on the network side and on the transformer side. No suitable circuits or methods are known for producing staircase voltages with a low harmonic content (analogously to multipoint U converters) for matrix converters.

In addition, for the present matrix converter applications, it is of major importance to be able to cope with high voltages and possible malfunctions without serious consequential damage in the relatively high power range. Disadvantageous items relating to this are:

In the event of a short circuit on the AC voltage side between the circuit points $N_1$ and $N_2$ (see FIG. 10), extremely high discharge currents flow from the filter capacitor on the AC voltage side, which can cause destruction, owing to the extremely high mechanical forces and/or arc damage that occur.

In the event of failure of power semiconductors or a faulty drive, the discharge current, which is like a short circuit, can flow directly through the semiconductors, destroying them and their contacts.

The very small stray inductance from the filter capacitor and from the converter branches which is required for the semiconductor switches in the matrix converter conflicts increasingly with the rising voltage level (with a peak value of up to about 50 KV for a 25 KV overhead wire voltage) for a design embodiment which is mechanically resistant to short circuits and is safe in terms of isolation. Furthermore, there are major impediments to unrestricted spatial arrangement of the components.

An arrangement as shown in FIG. 11 is known, inter alia from Kjaer, loc. cit. (see FIG. 3 there). In comparison to FIG. 8, this includes the following three modifications:

The filter capacitor is split into a number of capacitors. However, the resultant capacitance is still connected in parallel with the network-side connections of the matrix converter, so that the disadvantages also still remain.

Additional damping resistors are connected in a known manner in series with the filter capacitors. This measure results in high energy losses, although it has become necessary because the filter capacitors are additionally required as snubbers for the IGBTs.

The medium-frequency side of the matrix converters is based on a three-phase design. In comparison to a single-phase design, this allows somewhat lower harmonics on the network side. However, a staircase voltage that is sufficiently low in harmonics and has a freely variable number of voltage steps is still impossible.

SUMMARY OF THE INVENTION

An object of an embodiment of the invention is to specify power-electronic converters and associated control methods which can be implemented better and can be used universally without the restrictions mentioned above.

The circuit arrangement should not require any filter capacitors or snubber capacitors on the AC voltage side. It should be possible to smooth the undesirable power pulsation at twice the network frequency without major complexity in terms of energy stores, so that this power pulsation no longer occurs in the medium-frequency transformer and the downstream loads.

Accordingly, the converter branches of the known matrix converter arrangement, which are fitted with bi-directional switches, are, according to an embodiment of the invention, replaced by any desired number of identical two-pole networks, which are connected in series and have the following characteristics:

1) The two-pole networks each have at least one switching state (I) in which their terminal voltage assumes positive values irrespective of the magnitude and polarity of the terminal current.
2) The two-pole networks each have at least one switching state (II) in which their terminal voltage assumes negative values irrespective of the magnitude and polarity of the terminal current.
3) The two-pole networks have at least one internal energy store, preferably a capacitor.

When they are controlled appropriately, two-pole networks with the characteristics stated above, allow applied terminal voltages to be preset both on the network side and on the medium-frequency side, as will be explained in the following text.

They do not require any external energy stores for their operation, such as filter capacitors or snubbing capacitors.

With regard to the complexity in terms of semiconductors and energy stores, the advantage of the arrangement according to an embodiment of the invention is that all of the elements are used uniformly. This is particularly true if the entire required semiconductor area and the entire capacitor energy are considered. A two-system configuration (15 kV and 25 kV) is entirely possible without any switching operations in the power section. The relative additional complexity—in comparison to a pure 15 kV design—is less than in the case of known circuits.

Further advantages include:

The problems are restricted to physically small two-pole networks with relatively low voltages.

The strictly modular implementation of the power-electronic converter formed from any desired number of identical two-pole networks allows free, spatial arrangement of the components.

The converter allows staircase voltages with a low harmonic content to be produced both on the network side and on the medium-frequency side.

The number and operating voltage of the traction motors may be chosen independently of the number and operating voltage of the power-electronic two-pole networks.

The amplitude and frequency of the medium-frequency that is produced may be stabilized purely by control techniques, and independently of the network frequency and network voltage, in order to provide a simple feed for auxiliary systems.

Different network frequencies and voltages can be coped with with little complexity, without any additional switching devices in the power-electronic converter, the energy stores, the medium-frequency transformers or the traction motors.

In the event of failure of one or more of the two-pole networks, the operating capability can still be ensured without any additional switching devices (redundancy).

BRIEF DESCRIPTION OF THE DRAWINGS

Further advantages, features and details of the invention will become evident from the description of illustrated embodiments given hereinbelow and the accompanying drawings, which are given by way of illustration only and thus are not limitative of the present invention, wherein.

DETAILED DESCRIPTION OF THE PREFERRED EMBODIMENTS

Figure 1:
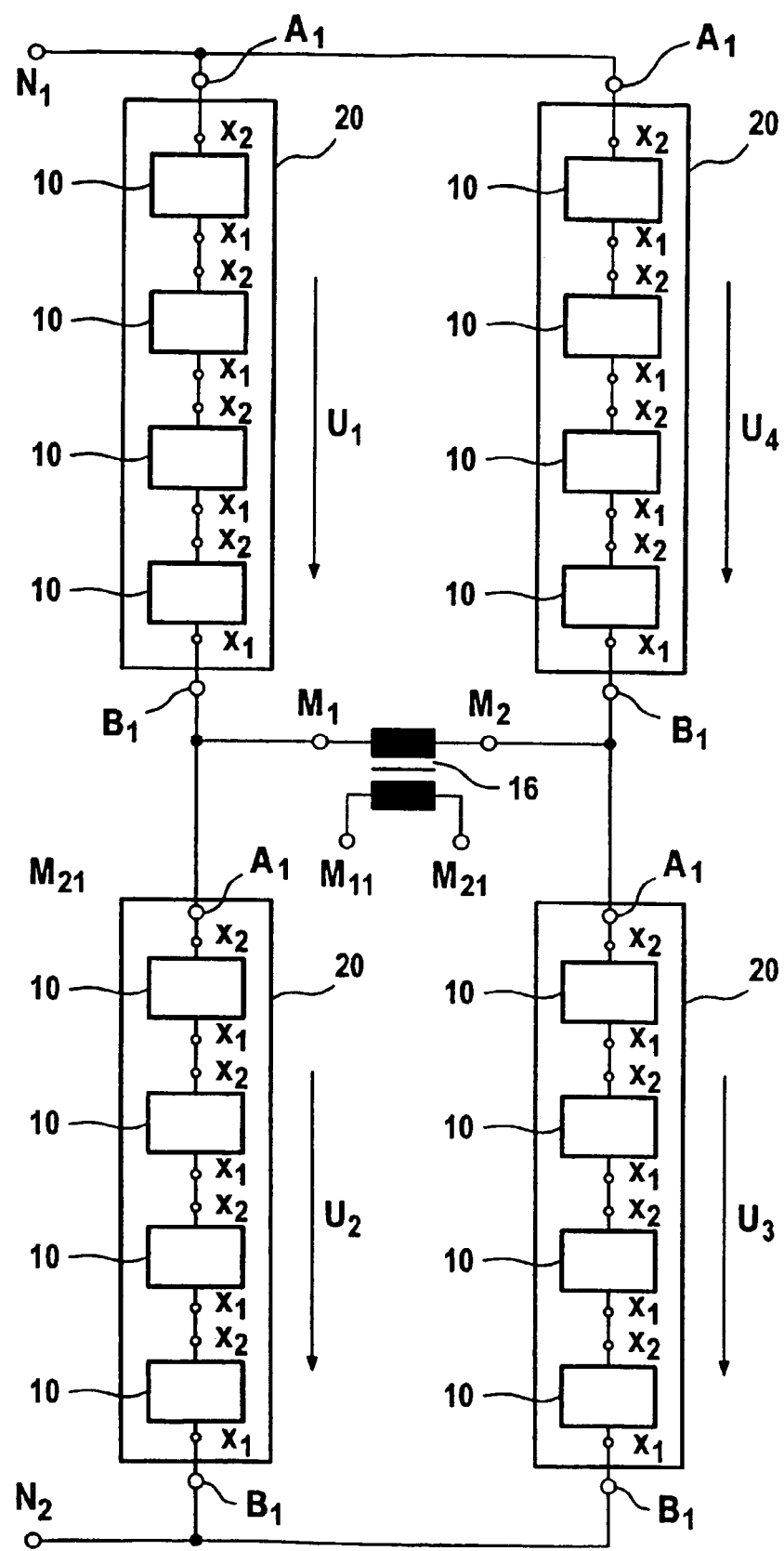
FIG. 1 shows the basic circuit of the direct converter according to an embodiment of the invention, in each case having four two-pole networks in each converter branch.

FIG. 1 shows a basic circuit for the matrix converter according to an embodiment of the invention. The network-side voltage $U_N$ is applied between the circuit points $N_1$ and $N_2$. Four converter branches 20 are arranged in the form of a bridge, on whose bridge diagonal a medium-frequency transformer is located. The converter branches 20 each include four two-pole networks 10, which have the characteristics described above.

Figure 2:
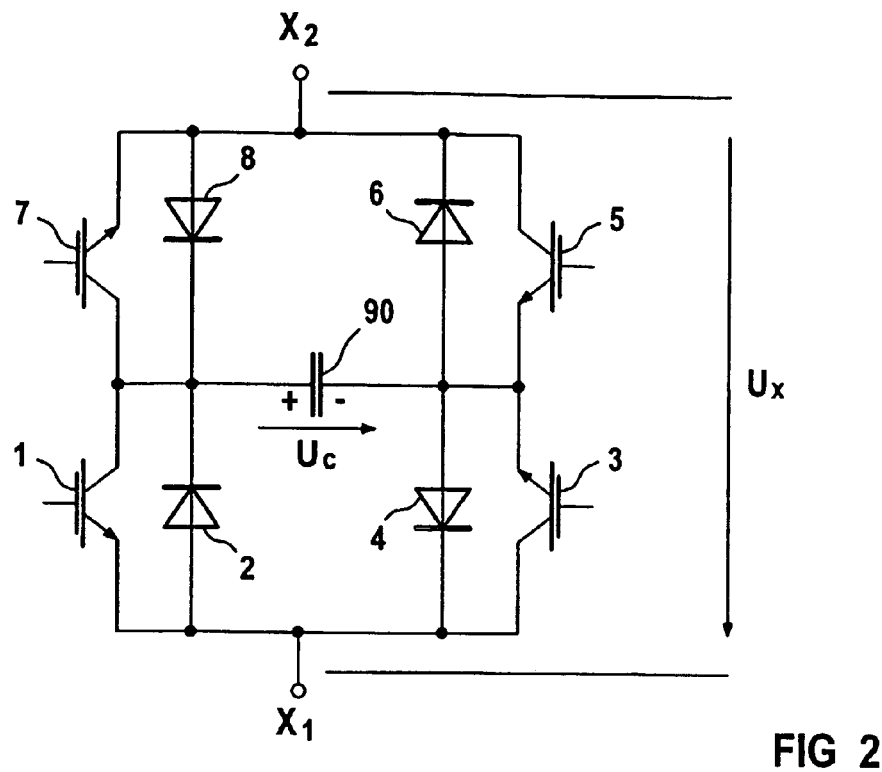
FIG. 2 shows a first variant of a single two-pole network in one converter branch.
Figure 3:
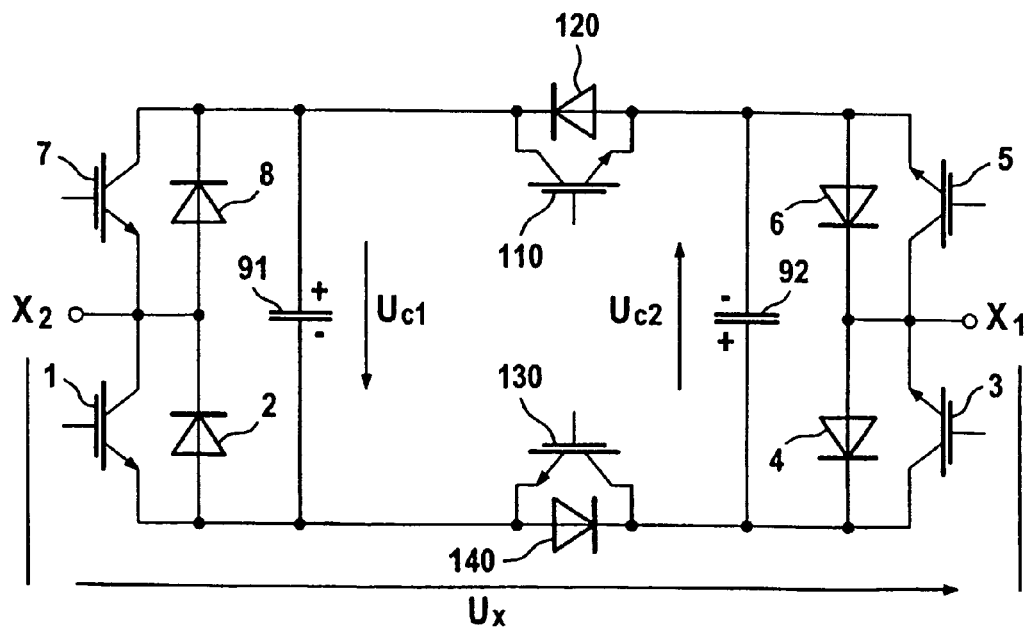
FIG. 3 shows a second variant of a single two-pole network in one converter branch.
Figure 4:
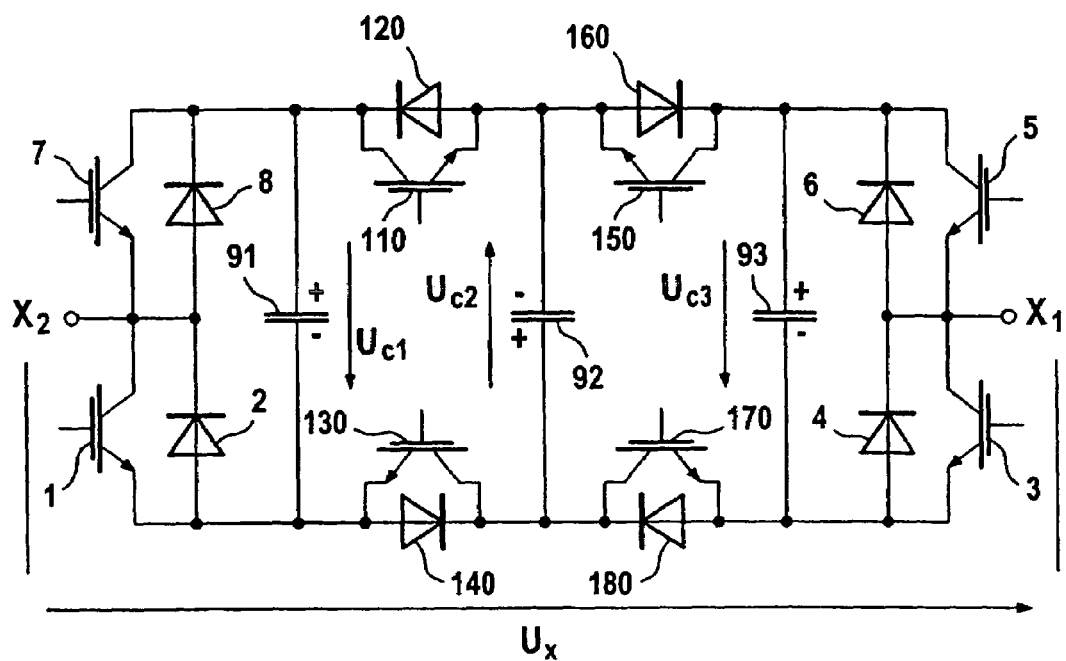
FIG. 4 shows a third variant of a single two-pole network in one converter branch.

FIGS. 2, 3 and 4 show possible advantageous implementations of the two-pole networks 10.

FIG. 2 is also known as a full-bridge circuit of a U converter or as a so-called four-quadrant controller, with the difference that it is used here as a two-pole network 10. The bridge circuit is formed from four IGBT transistors 1, 2; 3, 4; 5, 6; 7, 8. The connections on the DC side are connected to a capacitor 90.

An embodiment of the two-pole network 10 as shown in FIG. 2 additionally has the following characteristics:

Switching states III exist, in which the terminal voltage $U_x$ of a two-pole network 10 assumes the value zero irrespective of the magnitude and polarity of the terminal current.

A switching state IV exists, in which a two-pole network 10 emits no energy, but can absorb energy, irrespective of the terminal current direction.

Another possible embodiment of the two-pole network 10, as shown in FIG. 3, also has these additionally advantageous switching states. This is a chain circuit, that is to say two branches between the terminals $x_1$, $x_2$ with IGBTs connected in alternate polarity directions and capacitors which connect the junction points of in each case two IGBTs in each branch, in the illustrated example in each case three IGBTs 1, 2; 130, 140; 3, 4 and 7, 8; 110, 120; 5, 6 in each branch and two capacitors 91, 92. The circuit shown in FIG. 3, additionally has two further voltage stages, with a relatively small number of switches.

The chain circuit can be extended by further identical elements, as is shown in FIG. 4, for two branches each having four IGBTs 1, 2; 130, 140; 170, 180; 3, 4 and 7, 8; 110, 120; 150, 160; 5, 6 in each branch and three capacitors 91, 92, 93, thus further increasing the number of possible voltage stages.

In general, the state III (in the same way as the switching states I and II) will be used as an additional, discrete voltage stage in the control methods described in the following text. The switching state IV can be used in the event of interference and interruptions in operation. The terminal voltage $U_x$ is in this state limited in the same way as by overvoltage protection, which is highly advantageous.

Figure 5:
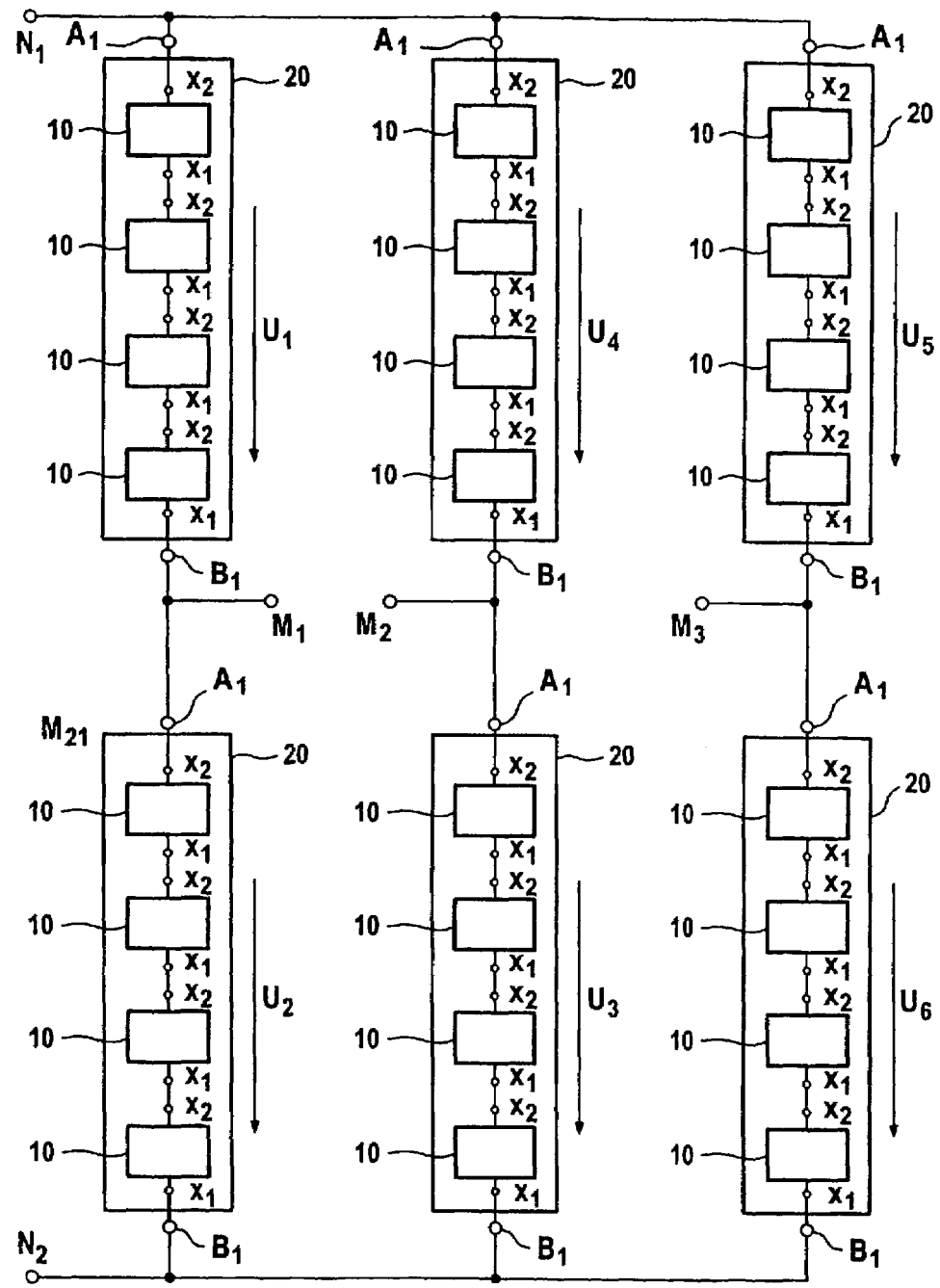
FIG. 5 shows a basic circuit for the direct converter according to an embodiment of the invention as a three-phase embodiment.
Figure 6:
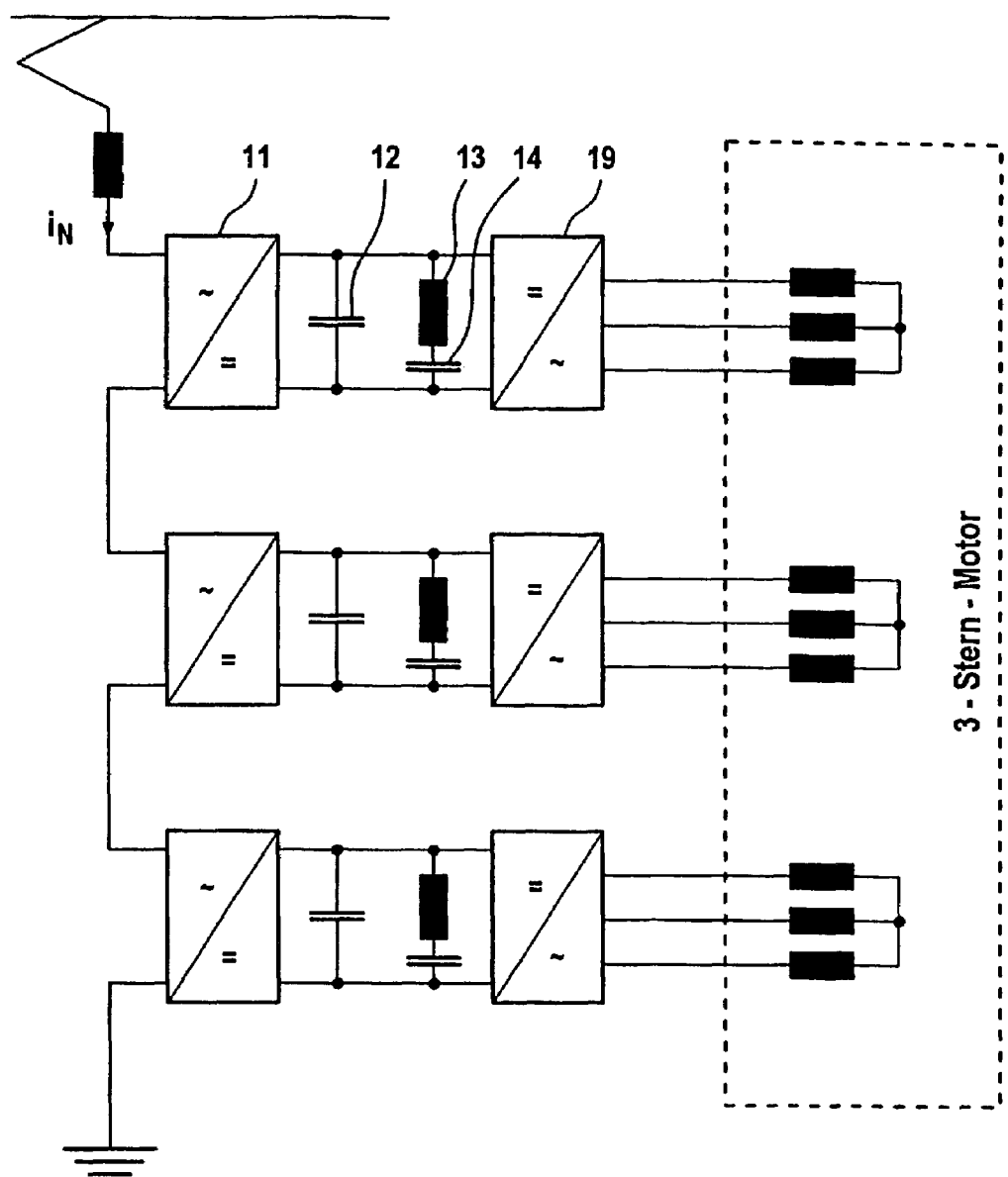
FIG. 6 shows a known power supply, without a transformer, with high-voltage-insulated traction motors.
Figure 7:
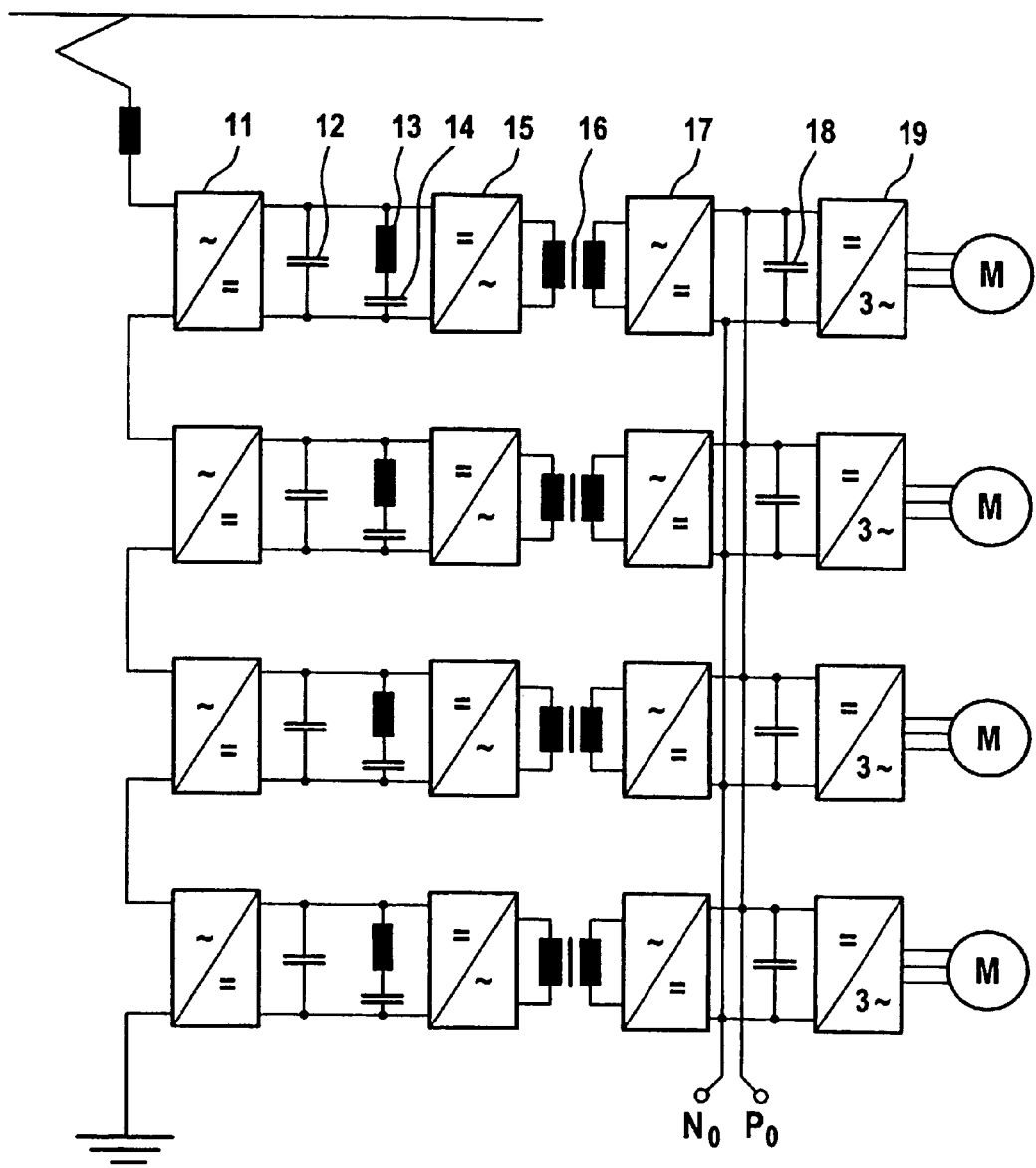
FIG. 7 shows a known power supply having two or more medium-frequency transformers.
Figure 8:
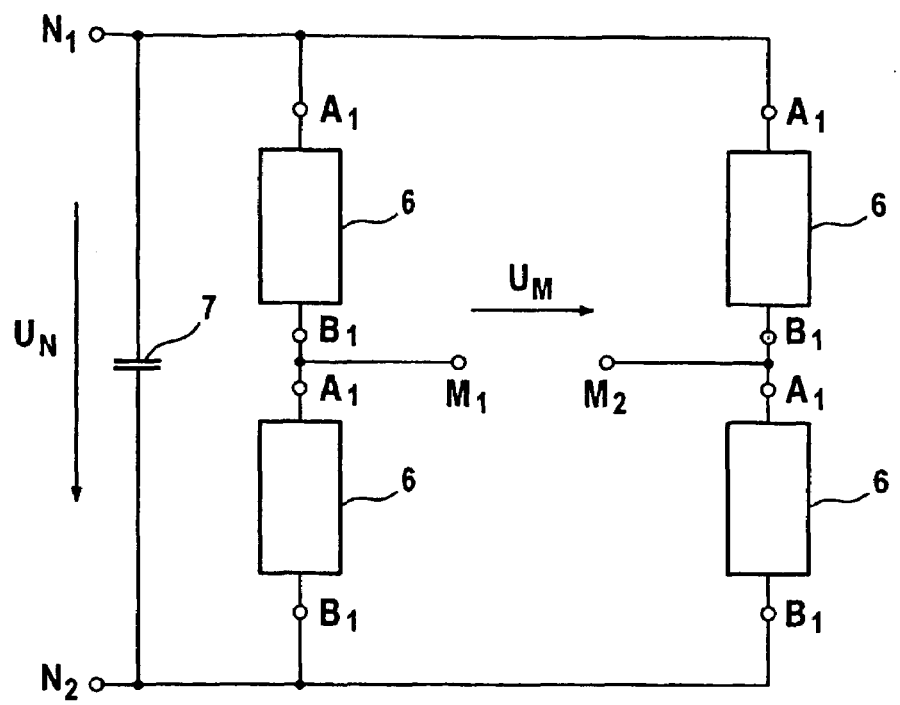
FIG. 8 shows the basic circuit of a known matrix converter.
Figure 9:
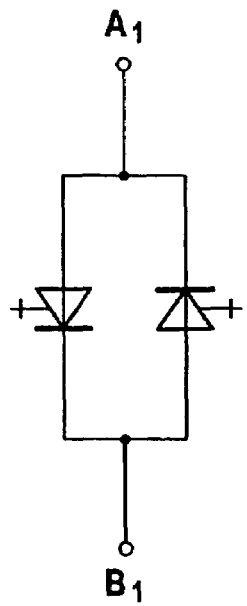
FIG. 9 shows a converter branch in the matrix converter as shown in FIG. 6, with two thyristors which can be switched off.
Figure 10:
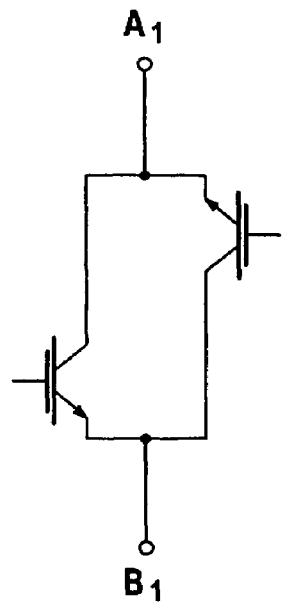
FIG. 10 shows a converter branch in the matrix converter as shown in FIG. 6 with two IGBT transistors.
Figure 11:
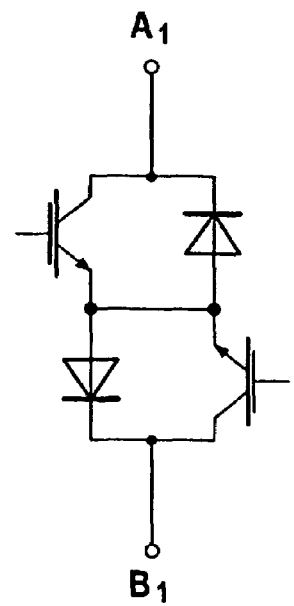
FIG. 11 shows a converter branch in the matrix converter as shown in FIG. 6 with two IGBT transistors and diodes connected back-to-back in parallel.

FIG. 5 shows an example illustrating that the direct converter according to an embodiment of the invention may also be in the form of a three-phase configuration.

The control method will be explained with reference to FIG. 1. In addition, in order to simplify the explanation, it is first of all assumed that the capacitor voltages $U_c$ of all the two-pole networks 10 are at the same initial voltage value $U_c=U_0$.

Each of the converter branches 20 in FIG. 1 can preset a terminal voltage $U_x$ $$U_1=n_1*U_0$$

$$U_2=n_2*U_0$$

$$U_3=n_3*U_0$$

$$U_4=n_4*U_0$$

The number of possible, different, discrete values of the terminal voltage $U_x$ depends on the number of switching states of the two-pole networks 10 and the number of series-connected two-pole networks 10 in each converter branch 20. For the sake of simplicity, the following explanation is based on the two-pole network 10 shown in FIG. 2 and a number of series switches of x=4. Each FIG. $n_1$, $n_2$, $n_3$, $n_4$ can then assume the value range $$\{-4,-3,-2,-1,0,+1,+2,+3,+4\}$$

The network-side voltage $U_N$, that is to say the potential difference between the circuit points $N_1$ and $N_2$, can thus be preset in discrete "staircase steps" with the step height of the initial voltage value $U_0$ between $$-8U_0 \leq U_N \leq +8U_0$$

such that:

$$U_N=U_1+U_2=U_3+U_4$$

The medium-frequency voltage $U_M$, that is to say the potential difference between the primary connections $M_1$ and $M_2$ of the medium-frequency transformer, can likewise be preset in discrete "staircase steps" with the step height of the initial voltage value $U_0$ between $$-8U_0 \leq U_M + 8U_0$$

such that $$U_M=U_2-U_3=U_4-U_1$$

The frequency, phase angle and amplitude of the network-side voltage $U_N$ and of the medium-frequency voltage $U_M$ can be preset completely independently of one another, provided that the desired maximum values $\hat{U}_N$ and $\hat{U}_M$ in total do not exceed twice the maximum possible voltage in one converter branch 20, that is to say:

$$\hat{U}_N + \hat{U} \leq 2U_{1max}$$

In the present example:

$$U_{1max}=4*U_0$$

(and in the same way $U_{2max}$, $U_{3max}$, $U_{4max}$)

In general, it is of interest for the network-side voltage $U_N$ and the medium-frequency voltage $U_M$ to approach the predetermined nominal values, which vary with time, as well as possible by in each case switching onwards by one staircase step at any desired times. This can be done for the network-side voltage $U_N$ and for the medium-frequency voltage $U_M$ completely independently of one another.

In order to raise the network-side voltage $U_N$ by one staircase step, $n_1$ and $n_4$ must be increased by one or, alternatively $n_2$ and $n_3$ must be increased by one. The medium-frequency voltage $U_M$ is not affected by this.

In order to increase the medium-frequency voltage $U_M$ by one staircase step, $n_2$ must be increased by one, and $n_1$ must be reduced by one or, alternatively, $n_3$ must be reduced by one and $n_4$ must be increased by one.

All of these switching operations each require a switching state change by in each case one two-pole network 10 in in each case one of two converter branches 20, that is to say a total of two switching state changes. Since two or more two-pole networks 10 are connected in series in each converter branch 20, there are in principle degrees of freedom in the choice of the two-pole network 10 to be switched in the relevant converter branch 20. These degrees of freedom can advantageously be used for the following purposes:

In order to reduce the required switching frequency for the two-pole networks 10.

In order to allow switching operations for the network-side voltage $U_N$ and the medium-frequency voltage $U_M$ to occur at random times without having to take any account of the restriction by the minimum switching times of the semiconductors.

In order to balance the individual capacitor voltages $U_c$ in the individual two-pole networks 10 in each converter branch 20.

The latter requires only one measurement of the capacitor voltages $U_c$. Corresponding methods are, in principle, known.

It should also be mentioned that, in principle, it is also possible to switch both the network-side voltage $U_N$ and the medium-frequency voltage $U_M$ at the same time but likewise with only two switching state changes. This can be used to further reduce the mean switching frequency of the semiconductors, although this may also result in minor restrictions to the waveform of the network-side voltage $U_N$ or of the medium-frequency voltage $U_M$.

An arrangement as shown in FIG. 1 can advantageously be precharged using a very low voltage auxiliary voltage source. The precharging process therefore need not be carried out via switches and resistors on the high-voltage side. This auxiliary voltage need only reach the order of magnitude of a capacitor voltage $U_c$ when the two-pole networks 10 are switched on successively during the charging process.

The charging process via the medium-frequency transformer can also advantageously be used by means of an existing auxiliary system converter, when this energy is available from a battery. The battery voltage may be considerably lower than the DC voltage for operation of the auxiliary system converter. The lack of switches on the high-voltage side and the charging and testing capabilities before the main switch on the high-voltage side is inserted are advantageous.

The capability of an arrangement as shown in FIG. 1 to operate can be maintained even in the event of failures in the area of the power electronics and control. This is achieved most easily by the two-pole networks 10 having the characteristic of producing a short circuit between their terminals $x_1$ and $x_2$ in the event of any failures. This is generally ensured in the case of semiconductor components with pressure contacts. However, for components with contact wires, it is additionally possible to arrange so-called transient suppressor diodes between the terminals $x_1$ and $x_2$, whose contacts (in this arrangement) need withstand only currents in the same order of magnitude as the operating currents.

The breakdown voltage of the transient suppressor diodes must be designed to be greater than the terminal voltages $U_x$ which occur between the terminals $x_1$ and $x_2$ during normal operation without any disturbances. If higher terminal voltages $U_x$ then occur in the event of a malfunction (redundancy situation)—as a result of the two-pole networks 10 being connected in series—these voltages are limited in the short term by the diode or lead to the diode being permanently short-circuited (impedance tending to zero). Both situations are permissible or desirable in order to make it possible to continue to operate the overall system. There is therefore no need for any additional switching arrangements.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A power supply, comprising:
   a direct converter, wherein each phase branch includes a number of identical two-pole networks connected in series, the direct converter being in the form of a bridge circuit whose bridge arms are the phase branches, wherein the bridge circuit is at least one of a two-phase and a three-phase circuit, and wherein the two-pole networks each have:
   at least one switching state in which their terminal voltage assumes positive values irrespective of the magnitude and polarity of the terminal current;
   at least one switching state in which their terminal voltage assumes negative values irrespective of the magnitude and polarity of the terminal current; and
   at least one internal energy store, and wherein
   at least one medium-frequency transformer is connected on a bridge diagonal of the bridge circuit.

2. The power supply as claimed in claim 1, wherein the energy store is a capacitor.

3. The power supply as claimed in claim 1, wherein the two-pole network is a bridge circuit with four electronic switches, whose bridge diagonal is connected to a capacitor.

4. The power supply as claimed in claim 1, wherein the two-pole network is a chain circuit with electronic switches in two parallel branches and capacitors which connect the junction points of in each case two electronic switches in each branch.

5. The power supply as claimed in claim 4, wherein the electronic switches are IGBTs connected in alternate polarity directions.

6. The power supply as claimed in claim 1, wherein transient suppressor diodes are connected in parallel with the two-pole networks.

* * * * *